United States Patent [19]

Dattoli et al.

[11] Patent Number: 5,297,152
[45] Date of Patent: Mar. 22, 1994

[54] FREE ELECTRON LASER WITH TWO SELF-STIMULATING ONDULATORS AT HIGHER ORDER HARMONICS

[75] Inventors: Giuseppe Dattoli, Ariccia; Luca Giannesi; Angelo Marino, both of Rome, all of Italy

[73] Assignee: Ente per le Nuove Tecnologie, l'Energia e l'Ambiente (ENEA), Rome, Italy

[21] Appl. No.: 796,372

[22] Filed: Nov. 22, 1991

[30] Foreign Application Priority Data

Dec. 5, 1990 [IT]  Italy ................................ 48541 A/90

[51] Int. Cl.$^5$ ................................................ H01S 3/00
[52] U.S. Cl. .............................................. 372/2; 372/69; 372/92; 372/20
[58] Field of Search .............. 372/2, 69, 20, 97, 92; 359/326

[56] References Cited

U.S. PATENT DOCUMENTS

| | | |
|---|---|---|
| 4,331,936 | 5/1982 | Schlesinger et al. |
| 4,367,551 | 1/1983 | Gover ........................ 372/2 |
| 4,809,281 | 2/1989 | Neil et al. |
| 4,999,839 | 3/1991 | Deacon ...................... 372/2 |
| 5,023,563 | 6/1991 | Harvey et al. ............ 359/326 |
| 5,107,508 | 4/1992 | Piestrup ..................... 372/2 |

OTHER PUBLICATIONS

R. Bonifacio et al., "Generation Of XUV Light By Resonant Frequency Tripling In A Two-Wiggler FEL Amplifier" from *Nuclear Instruments & Methods In Physics Research*, vol. A296, Nos. 1-3, published Oct. 15, 1990.

U. Bizzarri et al., "Above Threshold Operation Of The ENEA Free Electron Laser," from *Nuclear Instruments & Methods In Physics Research*, vol. A250, Nos. 1-2, published Sep. 1986.

I. Ben-zvi et al., "Design Of A Tandem Accelerator Free Electron Laser," from *Nuclear Instruments & Methods In Physics Research*, vol. A268, Nos. 2-3, published May 20, 1988.

*Primary Examiner*—Léon Scott, Jr.
*Attorney, Agent, or Firm*—Beveridge, DeGrandi, Weilacher & Young

[57] ABSTRACT

The object of the invention is a free electron laser with two self-stimulating ondulators at higher order harmonics comprising, in combination, a first section comprising an ondulator (UM1) operating as an oscillator, to generate coherent radiation with a determinate wave length ($\lambda$) and simultaneously the higher harmonics relevant thereto, and a second section comprising an ondulator (UM2) operating as an amplifier, tuneable at the frequency and the relevant harmonics of the coherent radiation generated in the first modulator (UM1).

11 Claims, 1 Drawing Sheet

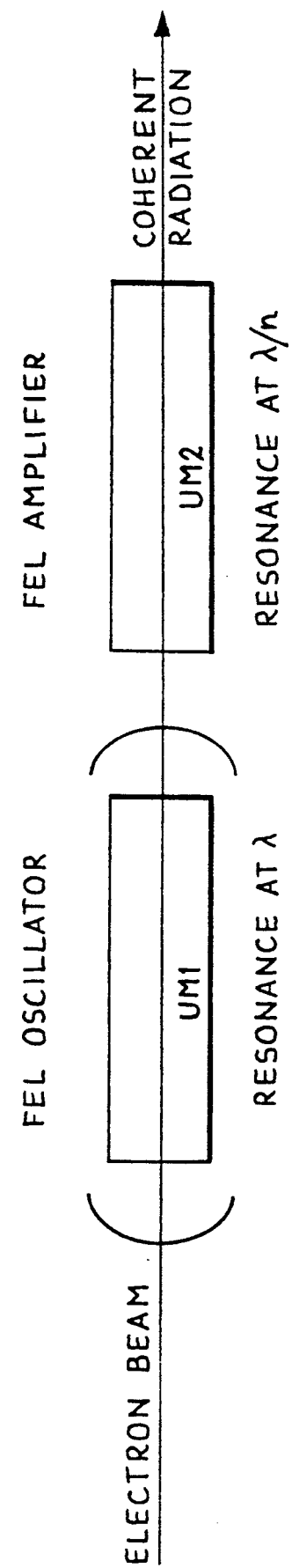

FREE ELECTRON LASER WITH TWO SELF-STIMULATING ONDULATORS AT HIGHER ORDER HARMONICS

The present invention generally relates to free electron lasers and more particularly is concerned with a free electron laser realized through the coupling of two undulators so combined as to achieve, first of all, an action of a self-induced stimulation at higher order harmonics and then an action of amplification of the selected harmonics.

As is known, so-called free electron lasers (named the FEL's, acronym of the English expression Free Electron Laser) have been recently developed. The operation of such lasers isn't based upon the interaction of atomic systems and electromagnetic radiation as in conventional systems, but is based upon the interaction of an ultrarelativistic electron beam, that propagates in a magnetic structure named the "undulator", with the radiation field to be amplified. Therefore their name derives only by the particular conformation or entity of what in a traditional laser is the medium or the active material. For the rest, as a matter of principle their operation doesn't stray from the operation of traditional lasers.

Therefore, the free electron laser operates in its traditional configuration either as an oscillator or as an amplifier. In the operation as an oscillator, which, as in conventional systems, provides the employment of an "active material" immersed in a cavity that resonates at the frequencies of interest, the free electron laser presupposes the existence of an optical cavity (i.e. of a cavity that resonates at the frequencies corresponding with the optical wavelengths) analogous to that of conventional lasers. In the configuration as an amplifier, which is independent of the existence of a self-stimulating structure and therefore is simply based upon the existence of an active material which the electromagnetic wave to be amplified is passed through, the free electron laser, as any other conventional amplifier laser, presupposes the existence of a suitable input signal to be amplified.

One of the properties that characterize a free electron laser compared with a conventional laser is its frequency tuneability, which is to be understood as the feature whereby the electron beam goes into resonance with the electromagnetic field, i.e. with the radiation field.

As a matter of principle, a free electron laser should be able to operate almost at any frequency. In fact, the resonance condition, which, as mentioned above, allows energy from an electron beam in an undulator to be transferred to a radiation field, depends on the square of the energy of the electron beam and this quantity can be varied of several orders of magnitude with continuity.

In practice, however, this tuneability is limited, also in the design stage, both in the operation as an oscillator and in the operation as an amplifier, by the absence of optics suitable for confining a radiation generated in a cavity or respectively by the availability of a suitable or desired input signal to be amplified.

The present invention aims at remedying the deficiencies mentioned above at least partly and at suggesting a free electron laser system, intrinsically innovatory compared with the devices existing at present, utilizeable through a very large wavelength range, from X rays to microwaves, able to self-induce a stimulation at higher order harmonics and to amplify the same.

Before passing to a detailed disclosure of the structure and of the operation of the free electron laser device according to the invention, it is desired to emphasize that the possibility has already been proved—and therefore is considered to be known art—of generating a coherent radiation at harmonics of orders higher than that of the fundamental frequency: this possibility is exploited in the present invention.

It is therefore the specific object of the invention a free electron laser with a stimulation self-induced at higher order harmonics comprising in combination a first section comprising an undulator (UM1) operating as an oscillator, to generate a coherent radiation with a determinate wavelength ($\lambda$) and simultaneously higher harmonics relevant thereto, and a second section comprising an undulator (UM2) operating as an amplifier, tuneable at the frequency and at the relevant harmonics of the coherent radiation generated in the first undulator (UM1).

Further particularities and advantages of the present invention will turn out to be apparent in the continuation of the specification, with reference to the annexed drawing, wherein the preferred embodiment is represented as a matter of illustration and not of limitation.

With reference now to the annexed FIGURE it is seen that the laser device according to the present invention can be considered as an oscillator-amplifier coupled system consisting, therefore, of two sections UM1 and UM2, having the electron beam at its input and the desired coherent radiation at its output.

In the first section comprising an undulator UM1, operating as an oscillator, a coherent radiation is generated with a certain wavelength on the basis of the classic operation mechanisms known per se and, simultaneously, by virtue of the abovementioned harmonic generation mechanism, higher order harmonics are excited.

The oscillator section UM1 is, per se, a conventional free electron laser section, the resonant cavity whereof can be endowed with mirrors with holes for allowing the electron beam to be injected and extracted. This free electron laser section has to operate thresholdwise to prevent the energy scattering induced under a condition of saturation in the electron beam from compromising the amplification operation of the selected harmonics in the subsequent section UM2. In this connection, the length of the cavity, controlled through a piezoelectric crystal, is utilized as a feedback or retroaction element to modify the gain and to maintain the system in saturation.

The only requisite which the structure of this first undulator UM1 in its operation as an oscillator has to answer is that this allows the electron beam to go into resonance with the electromagnetic field at the frequency of the harmonic of the n-th order which is to be first generated, naturally, and then amplified.

The second section comprising an undulator UM2, operating as an amplifier section, is tuned at the same frequency as the desired one of the harmonics induced in the cavity and provides for amplifying the signal.

This section, therefore, consists of an undulator UM2, the pitch whereof is determined by the condition of resonance at the various harmonics of higher order that can be produced in the first oscillator undulator UM1. For instance, if the radiation that is to be amplified corresponds with the third harmonic of the first amplifier undulator UM1, it will suffice to design the second amplifier undulator UM2 in such a manner that its pitch is equal to one third of that of the first oscillator undulator UM1 (the electromagnetic field intensity being equal).

The extraction efficiency is ensured by resorting to conventional schemes, such as the so-called "tapering" of the second amplifier undulator FM2 or by means of a recovery of the energy of the beam of electrons.

A double oscillator-amplifier section structure according to the present invention, presents itself very advantageous compared with the free electron lasers known hitherto. Firstly, in a free electron laser operating in the manner disclosed above and with pulsed electron beams, one would have a radiation structure, analogous to that of the electron beam, at disposal in the amplification region. Moreover, the modulation of the electron beam produced in the first oscillator undulator can considerably reduce the requisites which the length of the oscillator has to answer, in comparison with what happens in a conventional free electron laser operating as an amplifier. Finally, the greater power available as input signal allows the overall size of a free electron laser device to be further reduced, if this was really necessary, as in the straight section of an accumulation ring.

In the above the preferred embodiment has been disclosed in its structural and functional general features, without going into the design details for what is concerned with any specific wave length. It is, however, to be understood that those skilled in the art will be able to make modifications and variations to the disclosed structure without so departing from the scope of the enclosed claims.

I claim:

1. A free electron laser, comprising:
    oscillator means for generating coherent radiation at a determinate frequency and at higher order harmonic frequencies of said determinate frequency; and
    amplifier means for amplifying said coherent radiation at said at least one of said higher order harmonic frequencies generated by said oscillator means, said amplifier being tuneable to at least one of said higher order harmonic frequencies.

2. A free electron laser according to claim 1, wherein said amplifier means is tuned to at least one of said higher order harmonic frequencies.

3. A free electron laser according to claim 1, wherein said amplifier means is tuneable to said determinate frequency and operable as an amplifier for amplifying said coherent radiation at said determinate frequency to which said amplifier means is tuned.

4. A free electron laser according to claim 1, wherein said oscillator means includes an undulator.

5. A free electron laser according to claim 1, wherein said amplifier means includes an undulator.

6. A free electron laser according to claim 1, wherein said oscillator means includes a free electron laser having a conventional resonant cavity with mirrors and holes for injecting and extracting an electron beam.

7. A free electron laser according to claim 6, wherein a length of said resonant cavity is controlled with a piezoelectric crystal.

8. A free electron laser according to claim 1, including efficiency improvement means for improving an extraction efficiency of said free electron laser.

9. A free electron laser according to claim 8, wherein said efficiency improvement means includes means for recovering energy of an electron beam of said free electron laser.

10. A free electron laser according to claim 8, wherein said efficiency improvement means includes tapering means for tapering said amplifier means.

11. A method of producing a free electron laser beam, comprising the steps of:
    generating a coherent radiation at a determinate frequency and at higher order harmonic frequencies of said frequency; and
    amplifying said coherent radiation at said at least one of said higher order harmonic frequencies.

* * * * *